(12) United States Patent
Kuhn et al.

(10) Patent No.: US 9,939,207 B2
(45) Date of Patent: Apr. 10, 2018

(54) METHOD AND APPARATUS FOR THE PRE-CONDITIONING OF LATENT HEAT STORAGE ELEMENTS

(71) Applicant: VA-Q-TEC AG, Wurzburg (DE)

(72) Inventors: Joachim Kuhn, Wurzburg (DE); Fabian Eschenbach, Rottendorf (DE); Martin Heinemann, Wurzburg (DE)

(73) Assignee: VA-Q-TEC AG, Wurzburg (DE)

( * ) Notice: Subject to any disclaimer, the term of this patent is extended or adjusted under 35 U.S.C. 154(b) by 216 days.

(21) Appl. No.: 14/442,981

(22) PCT Filed: Dec. 9, 2013

(86) PCT No.: PCT/EP2013/003707
§ 371 (c)(1),
(2) Date: May 14, 2015

(87) PCT Pub. No.: WO2014/090390
PCT Pub. Date: Jun. 19, 2014

(65) Prior Publication Data
US 2015/0300752 A1    Oct. 22, 2015

(30) Foreign Application Priority Data

Dec. 10, 2012  (DE) .......................... 10 2012 024 027
Dec. 27, 2012  (DE) .......................... 10 2012 025 192

(51) Int. Cl.
  *G05D 23/00*   (2006.01)
  *F28D 20/02*   (2006.01)
  (Continued)

(52) U.S. Cl.
  CPC .............. *F28D 20/02* (2013.01); *F25D 3/00* (2013.01); *F25D 3/02* (2013.01); *F25D 29/003* (2013.01);
  (Continued)

(58) Field of Classification Search
  CPC ... F25D 3/00; F25D 3/005; F25D 3/02; F25D 3/06; F25D 3/08; F25D 11/00;
  (Continued)

(56) References Cited

U.S. PATENT DOCUMENTS 4,145,895 A  *  3/1979  Hjertstrand ............... F25D 3/00
                                                                 165/47
4,528,439 A     7/1985  Marney, Jr. et al.
(Continued)

FOREIGN PATENT DOCUMENTS

DE   10058566 C2   10/2002
DE   10322764 A1   12/2004
(Continued)

OTHER PUBLICATIONS

Brochure "va-Q-tec Packaging Portfolio", Jan. 2011.
(Continued)

*Primary Examiner* — Travis Ruby
(74) *Attorney, Agent, or Firm* — Andrus Intellectual Property Law, LLP

(57) ABSTRACT

A process is for the pre-conditioning of one or more latent heat storage elements in the case of which the temperature or the narrow temperature range of the phase transition defines a target temperature and the latent heat storage elements are heated up to the target temperature. The latent heat, storage elements are cooled to an initial temperature below the target temperature and this initial temperature is determined. The latent heat storage elements at the initial temperature are introduced into a thermally insulated container and the container is then closed. The interior of the closed container is, or has been, connected to a heating device of which the thermal output which takes effect in the interior of the closed container is known. The initial temperature of the latent heat storage elements, the thermal (Continued)

capacity of the latent heat storage elements located in the container and also the target temperature of the latent heat storage elements are used to calculate the quantity of heat which has to be fed to the interior of the container in order for the latent heat storage elements to reach the target temperature (desired quantity of heat). The heating device is switched on and is operated continuously, or at intervals, until the desired quantity of heat has been fed to the interior of the dosed container.

18 Claims, 2 Drawing Sheets

(51) Int. Cl.
    *F25D 29/00*     (2006.01)
    *F25D 3/02*     (2006.01)
    *F25D 3/00*     (2006.01)

(52) U.S. Cl.
    CPC ...... *F28D 20/028* (2013.01); *F25D 2303/082* (2013.01); *F25D 2400/02* (2013.01); *F25D 2500/04* (2013.01); *F25D 2600/04* (2013.01); *Y02E 60/145* (2013.01)

(58) Field of Classification Search
    CPC ............... F25D 29/003; F25D 2201/14; F25D 2303/08; F25D 2303/082; F25D 2303/085; F25D 2400/02; F25D 2400/32; F25D 2500/04; F25D 2600/04; F25D 2700/12; F28D 20/02; F28D 20/028; B65D 81/38
    See application file for complete search history.

(56) References Cited

U.S. PATENT DOCUMENTS

| | | |
|---|---|---|
| 6,482,332 B1 | 11/2002 | Malach |
| 2005/0150244 A1* | 7/2005 | Hillmann ............... B65D 5/566 62/371 |
| 2005/0188714 A1* | 9/2005 | Wallace .................. A61J 1/165 62/371 |
| 2007/0051734 A1* | 3/2007 | Kuhn ........................ F25D 3/06 220/592.27 |
| 2008/0099492 A1* | 5/2008 | Mayer ................ B65D 81/3816 220/592.2 |
| 2008/0276643 A1* | 11/2008 | Heroux .................... A01N 1/02 62/457.2 |
| 2009/0039088 A1* | 2/2009 | Williams .................. F25D 3/08 220/592.26 |
| 2011/0067852 A1 | 3/2011 | Farrar |

FOREIGN PATENT DOCUMENTS

| | | |
|---|---|---|
| DE | 202006004344 U1 | 6/2006 |
| DE | 102006032435 A1 | 1/2008 |
| DE | 102012006743 A1 | 10/2013 |
| WO | 9717580 A1 | 5/1997 |
| WO | 2004104498 A1 | 12/2004 |

OTHER PUBLICATIONS

International Search Report for PCT/EP2013/003707 dated May 9, 2014.

"Latentwarmespeicher", BINE Information Services, Theme Info IV/2002.

* cited by examiner

Fig., 1

METHOD AND APPARATUS FOR THE PRE-CONDITIONING OF LATENT HEAT STORAGE ELEMENTS

CROSS-REFERENCE TO RELATED APPLICATIONS

This application is the U.S. national stage application of International Application PCT/EP2013/003707, filed Dec. 9, 2013, which international application was published on Jun. 19, 2014, as International Publication WO 2014/090390 in the German language. The international application is incorporated herein by reference, in entirety. The international application claims priority to German Patent Application No. 102012024027.9, filed Dec. 10, 2012 and German Patent Application No. 102012025192.0, filed Dec. 27, 2012, which are incorporated herein by reference, in entirety.

FIELD

The invention relates to a method for the pre-conditioning of one or more latent heat storage elements as claimed in claim 1 and to an apparatus for the pre-conditioning of one or more latent heat storage elements as claimed in claim 11.

BACKGROUND

For the storage of heat in a storage material suitable for this purpose, the temperature of said storage material is normally increased. This form of heat storage is called sensible heat storage.

Whenever, in a material suitable for this purpose, a phase transition takes place, for example the transition from the solid into the liquid phase (or vice versa), the relationship between the temperature of the storage material, and the heat absorbed (or output) by the storage material is no longer linear, in the event of a transition from solid to liquid, the heat storage material begins to melt when the temperature of the phase transition is reached. The storage material maintains this temperature until the storage material has completely melted. Only then does an increase in the temperature occur again upon further absorption of heat.

Since virtually no increase in the temperature occurs for a relatively long time despite the supply of heat, this is called latent heat. In the case, for example, of the typical phase transition solid/liquid, the latent heat is identical to the melting heat or crystallization heat of the storage material.

A latent heat storage material has the great advantage that it can be used to store relatively large quantities of heat within a small temperature range. Since a phase transition takes place over a certain period of time at a substantially constant temperature, temperature fluctuations can be compensated for and temperature peaks avoided.

Latent heat storage materials are known in various forms. In English terminology, these materials are also called PCM materials (phase change materials).

At a target temperature (temperature of the phase transition) of approximately 0° C., water with different additives can be used as the latent heat storage material. For cold storage below 0° C., use is made, for example, of suitably prepared salt solutions.

In the region just above 0° C., other materials, for example those on the basis of paraffins, are more suitable.

In particular, as background, reference is made to the overview article from BINE Information Service "Themeninfo IV/02 aus dem Jahre 2002 [Theme info IV/02 from 2002]", (FIZ Karlsruhe, project code 0329840A-D, which is retrievable at www.bine.info, keyword: "Latentwärmespeicher [Latent heat storage]"). For the general background of latent heat storage materials and the use possibilities thereof, reference is hereby made by reference to the content of this citation.

A latent heat storage element according to the present invention is a latent heat storage material in a closed covering which is optionally also provided with a pressure-equalizing valve. A macro-encapsulated PCM material is also mentioned in this respect. The covering is frequently made from plastic. The basic structure is known, for example, from what are referred to as cooling batteries.

Latent heat storage elements of this type can be considered individually or else as a plurality of latent heat storage elements installed, for example, in a corresponding container.

There are, in the meantime, latent heat storage elements of the type under discussion for an abundance of target temperatures, in particular also from, the applicant (brochure "va-Q-tec Packaging Portfolio, January 2011"). Latent heat storage elements for target temperatures of 37° C., 22° C., 4° C., 0° C., −19° C., −21° C. and −32° C. are found, there. Other providers have comparable latent heat storage elements in their sales range, sometimes also for different target temperatures.

Latent heat storage elements of the type under discussion are used in a particular field of use in thermally insulated containers, in particular for transport purposes. For example, this is true of the transport of temperature-sensitive items, such as pharmaceuticals, biotechnological products, test apparatuses or samples for and from clinical studies, transplant items or blood reserves. In this field of use, the optimum transport and storage temperature which absolutely has to be maintained is, for example, 2° C. to 3° C. The products are frequently only stable at ail within a very narrow temperature range. The products therefore absolutely have to be transported and stored within this temperature range. In addition, frequently such products, which are highly sensitive with regard to the transport temperature, must not ever freeze. Temperatures below 0° C. most then be reliably avoided. The target temperature thus has to be reliably reached and maintained with, comparatively little deviation.

The temperature which is maintained with little deviation by the latent heat storage element during the phase transition and which results from the used latent heat storage material of the latent heat storage element is designated below as the target temperature.

The prior art on which the present invention is based (WO 2004/104498 A2) relates to a thermally insulated container, in particular for transport purposes, wherein the container Is insulated against heat exchange with the ambient atmosphere, preferably by vacuum insulation panels, and has at least one latent heat storage element of the type under discussion in the interior. To this extent, reference is made to the disclosure of the previously published document from which many aspects of the use of latent heat storage elements in transport containers can be gathered.

The technology of vacuum insulation panels has basically already been known for a relatively long time, but is being continuously perfected in terms of production and material. For vacuum insulation panels, reference may be made in principle to this extent to DE 100 58 566 C2 belonging to the applicant of the present application. Vacuum insulation panels of this type are currently the most efficient thermal insulation elements.

SUMMARY

The present case now concerns a method and an apparatus for the pre-conditioning of latent heat storage elements.

Since the inside temperatures in thermal transport containers have to remain within a narrow temperature range during transport, the temperature of the latent heat storage material in the latent heat storage elements is intended to be close to the melting point from the beginning of the transport. The latent thermal capacity of the latent heat storage elements can therefore be substantially completely used for the transport. Long transport periods at a substantially constant inside temperature can therefore be achieved.

By means of a particularly precise setting of the target temperature (the starting temperature) of the latent heat storage elements, it can even be ascertained whether the temperature in the interior of the transport container is intended to be kept constant for a long time primarily against cold outside temperatures, primarily against hot outside temperatures or against both influences.

Let us consider, for example, a latent heat storage material which melts between 3° C. and 5° C. If, with the latter, the inside temperature of a transport container is intended to be kept below 8° C. for as long as possible at hot summer temperatures, this material should be pre-cooled to as close to 3° C. as possible before the beginning of the transport. At best, pre-conditioning to the lower limit of the tolerance range of the target temperature, that is, for example, to approximately 3° C. here, therefore takes place (in the event of a positive target temperature) such that as great a quantity of heat as possible can still be absorbed during the use in the thermally insulated transport container. This is namely equivalent to the fact that the target temperature in the transport container can be maintained relatively precisely over a comparatively long period of time.

However, the same latent heat storage material can also serve continuously to keep the inside temperature in the transport container reliably above the freezing point at low ambient temperatures far below the freezing point (for example, in the unheated hold of an aircraft on an intercontinental flight). The previously described latent heat storage material then first has to be pre-conditioned to be warmer, i.e., if anything, to the upper edge of the temperature range of the phase transition.

For the pre-conditioning of latent heat storage elements, a pre-cooling temperature which is as precise as possible and which, as explained, is intended to be as close as possible to or within the tolerance range of the target temperature of the latent heat storage material used is therefore required.

For the pre-conditioning of latent heat storage elements of this type, the latter to date have been put into a cooling room. A cooling room normally does not have an especially precise temperature setting. For example, a typical freezing room temperature is 5° C. with a tolerance range of +/−2° C., i.e. somewhere between 3° C. and 7° C. This is insufficient for intended uses, such as in the sphere of biotechnological products, etc., as stated above. If the requirements for transport or other handling of temperature-sensitive items is to be achieved, complicated pre-conditioning methods or particularly precisely controllable cooling devices nave to be used. Complicated pre-conditioning methods of this type are prone to error. It is also not possible for the methods to be carried out in all countries, in particular not in less developed countries.

The invention is therefore based on the problem of specifying a method and an apparatus for the pre-conditioning of latent heat storage elements, which ensures that the latent heat storage elements are pre-conditioned with the target temperature thereof for the use thereof.

The previously presented problem is solved by a method with the features of claim 1. Preferred refinements and developments are the subject matter of claims 2 to 10.

In the claims, the plural for the latent heat storage elements is used. This serves exclusively for the simplified explanation of the substantive matter. In principle, of course, method and apparatus are also used whenever, in a situation, only an individual latent heat storage element is intended to be pre-conditioned.

The invention described here persuasively solves the previously described problem of pre-conditioning one or more latent heat storage elements. In this method, at the beginning, the latent heat storage elements are cooled to an initial temperature which is preferably significantly below the target temperature. This can be undertaken, for example, by the latent heat storage elements being put into a cooling room, optionally even into a freezing room. Depending on the target temperature, the operation can also be carried, out with colder PCM materials, for example with water ice or dry ice. It is important that, before a subsequent further handling of the latent heat storage elements, the actual temperature thereof is to some extent precisely known, i.e. the initial temperature is in any case determined in a temporally usable relationship with the following method steps.

The initial temperature, the thermal capacity of the latent heat storage elements handled in the present method, and the target temperature of the latent heat storage elements are then used to calculate the quantity of heat which has to be supplied to the latent heat storage elements in order to reach the target temperature of the latent heat storage elements. This is the desired quantity of heat.

In order to have controlled boundary conditions for the procedure according to the invention, the latent heat storage elements have to be introduced, after cooling to the initial temperature, into a thermally insulated, closed container. The latter creates the substantially constant boundary conditions in relation to the ambient atmosphere. In order to supply the desired quantity or heat to the interior of the container with the latent heat storage elements which are located therein and are still at the initial temperature, the heating device is switched on. The latter is then operated continuously or optionally also at intervals by means of the control device until the desired quantity of heat has been introduced into the interior of the container. By means of the insulation of the container, the heat introduced into the interior of the container by the heating device is distributed uniformly in the container and therefore also uniformly to the latent heat storage elements. A possibly fluctuating outside temperature of the ambient atmosphere has virtually no effect on the interior of the thermally insulated, closed container.

Of decisive importance for the teaching of the present invention is the fact that the latent heat storage elements are pre-conditioned by a defined, previously calculated desired quantity of heat (i.e. a corresponding desired quantity of energy) being supplied to the interior of the closed container. This quantity of heat is measured in the unit J (Joule) or, with greater emphasis on the energy consideration, in kWh (kilowatt hours). How the temperature in the interior of the container develops during the operation of the heating device is not of interest.

Since the method according to the invention calculates the desired quantity of heat to be supplied and then supplies the latter to the interior of the container, the pre-conditioning of the latent heat storage elements can be carried out with particularly great precision. This is because, by ascertaining the desired quantity of heat, it is possible to define the portion to which the PCM materials should already be liquid in the latent heat storage elements and the portion to which the materials should still be solid. Therefore, given a substantially constant target temperature, by adaptation of the desired quantity of heat to the task of the latent heat storage elements, the latter can be pre-conditioned in such a manner that they are still virtually completely solid or already virtually completely liquid. The latent heat storage elements can therefore be pre-conditioned in a targeted manner for the particular intended use explained further above. The pre-conditioning can therefore take info consideration whether the latent heat storage elements subsequently have to carry out their function during use in the closed container at very cold or at very hot outside temperatures.

In the case of transports in which the item to be transported is sensitive both to heating and to cooling, but in which it is not possible reliably to forecast whether the outside temperatures during the transport are rather above or rather below the temperature or the temperature range of the phase transition of the latent heat storage elements, the target temperature will be controlled with a desired quantity of heat such that the latent heat storage elements will be substantially in the central range between liquid and solid. The method according to the invention for pre-conditioning the latent heat storage elements is focused particularly on the property of the latent heat storage elements of having an extremely high energy density in the phase transition range.

In addition to the input variables, which are cited in claim 1, for determining the desired quantity of heat, it can be recommenced that, as a further input variable for calculating the desired quantity of heat, the initial temperature of the container before the introduction of the latent heat storage elements, which are at the initial temperature thereof, is measured and is used in the calculation of the desired quantity of heat.

As has already been explained above, it can furthermore be recommended that the target temperature of the latent heat storage elements is placed into the lower part or onto the lower limit of the temperature range of the phase transition of the latent heat storage elements.

Two possibilities can be realized for the heating device. Either the heating device itself is arranged outside the container and is connected to the interior of the container in a heat-transmitting manner. For example, a fan or the like could be envisaged here. However, in this case, the complete thermal insulation of the container is interrupted at this point. Accordingly, it is recommended, rather to arrange the heating device from the outset in the interior of the container and to control the heating device from outside the container merely by means of the control device, i.e. primarily to switch said heating device on and off.

Such a heating device can involve, for example, electric heating. However, other heat sources of a general type, the thermal output of which is known or can easily be calculated, are also suitable. The use in conjunction with a ventilator, i.e. in the form, for example, of a fan heater, is particularly preferred since the transmission of heat to the latent heat storage elements is evened out as a result. The quantity of energy to be used for this purpose has to be taken into consideration, of course, in the overall calculation.

If the heating device has been arranged in the interior of the container, if is recommended that the heating device is removed from the container after the desired quantity of heat is reached. The latent heat storage elements do not yet have to have reached the target temperature thereof at this time. The heating device is generally already switched off when the latent heat storage elements have still not reached the target temperature thereof. On the contrary, after the heating device is switched off, the latent host storage elements continue to extract, from the interior of the closed container, the excess quantity of heat still located therein and thus reach the target temperature after the equalizing process.

According to the invention, the heating device is preferably controlled by means of an electric or electronic control device. It is thus intended to be avoided that an operator makes operating errors. The desired quantity of heat can be calculated in the control device itself. The control device then has a corresponding input option or is connected to corresponding sensors. The control device then also has to have an appropriate computing capacity in order to carry out the corresponding calculations.

However, it can also be provided that the desired quantity of heat is not calculated in the control device, but rather in a computer device separate from the control device. For example, this can be undertaken with a container management program used on a normal PC. Only the result of this calculation is then still passed on to the control device. This can take place automatically or by means of an operator.

In principle, it is also possible in turn to carry out the actual calculation of the quantity of heat in a separate unit which is neither a control device nor a separate computer device. Finally, manual calculations are also possible in principle. However, they are associated with a relatively great error rate.

It is important that the control device controls the heating device over time in such a manner that the desired quantity of heat is actually introduced into the interior of the container. For this purpose, for example, the control device can continuously measure the quantity of heat already introduced and can then switch off the heating device if the accumulated value of the heat introduced corresponds to the desired value predetermined by the calculation program.

After the method according to the invention for the pre-conditioning of latent heat storage elements is finished, the latent heat storage elements are at their target temperature. They have been brought to said target temperature in an optimum and error-free manner. In the example case explained at the beginning, they are located in the lower part of the temperature range of the phase transition, below 4° C., in the vicinity of 3° C. This optimum pre-conditioning of the latent heat storage elements succeeds because of the "inverted pre-conditioning" according to the invention.

The method according to the invention can be carried out particularly expediently if the container used is directly a transport container provided for subsequent transport of the temperature-sensitive items. A container thermally insulated with vacuum insulation panels is particularly preferred.

In this case, the heating device is preferably removed from the container before the transport of the transport-sensitive items.

The method according to the invention functions for any temperature ranges and any latent heat storage elements.

With regard to the apparatus, the previously presented, problem is solved with an apparatus as claimed in claim 11. Preferred refinements and developments are the subject matter of claims 12 to 18.

The explanations regarding the apparatus according to the invention correspond to the explanations which have been given previously regarding the method.

For the configuration of the thermally insulated, closed container and the insulation thereof, reference may be made to the prior art previously discussed herein. This involves the principle of the thermally insulated container, wherein the statements of the specific requirement can be left open. Vacuum insulation panels (see the citations previously mentioned) are of particular advantage for the thermal insulation of the container. However, more classical insulation made from polyurethane, etc., can also be used. For the configuration of the container, in particular when the container serves at the same time and subsequently as a transport container for the temperature-sensitive items, it is recommended to use drawers in which the latent heat storage elements in their stable covering can be held in a defined position preferably on the container wall.

The present invention has the advantage that conventional cooling rooms or freezing rooms can be resorted to for the pre-conditioning of the latent heat storage elements. The temperature in the respective preparation room is not important. It is important only that the initial temperature of the latent heat storage elements is rather precisely noted before the calculation of the desired quantity of heat is carried out. This can be undertaken in a simple manner. Even a certain scope of fluctuation in the initial temperature can be accepted here because the latent heat storage elements here are within the range of sensible heat storage.

It is of particular importance that operators scarcely have to intervene in the method because only the essential starting data have to be input. The control device or the calculation software completes the rest.

The apparatus can be provided with corresponding display devices for displaying the desired values, and therefore simple checking is possible at any time.

BRIEF DESCRIPTION OF THE DRAWINGS

The invention will now be explained in more detail below with reference to a drawing illustrating just one preferred exemplary embodiment. In the drawing

DETAILED DESCRIPTION OF THE DRAWINGS

Figure 1:
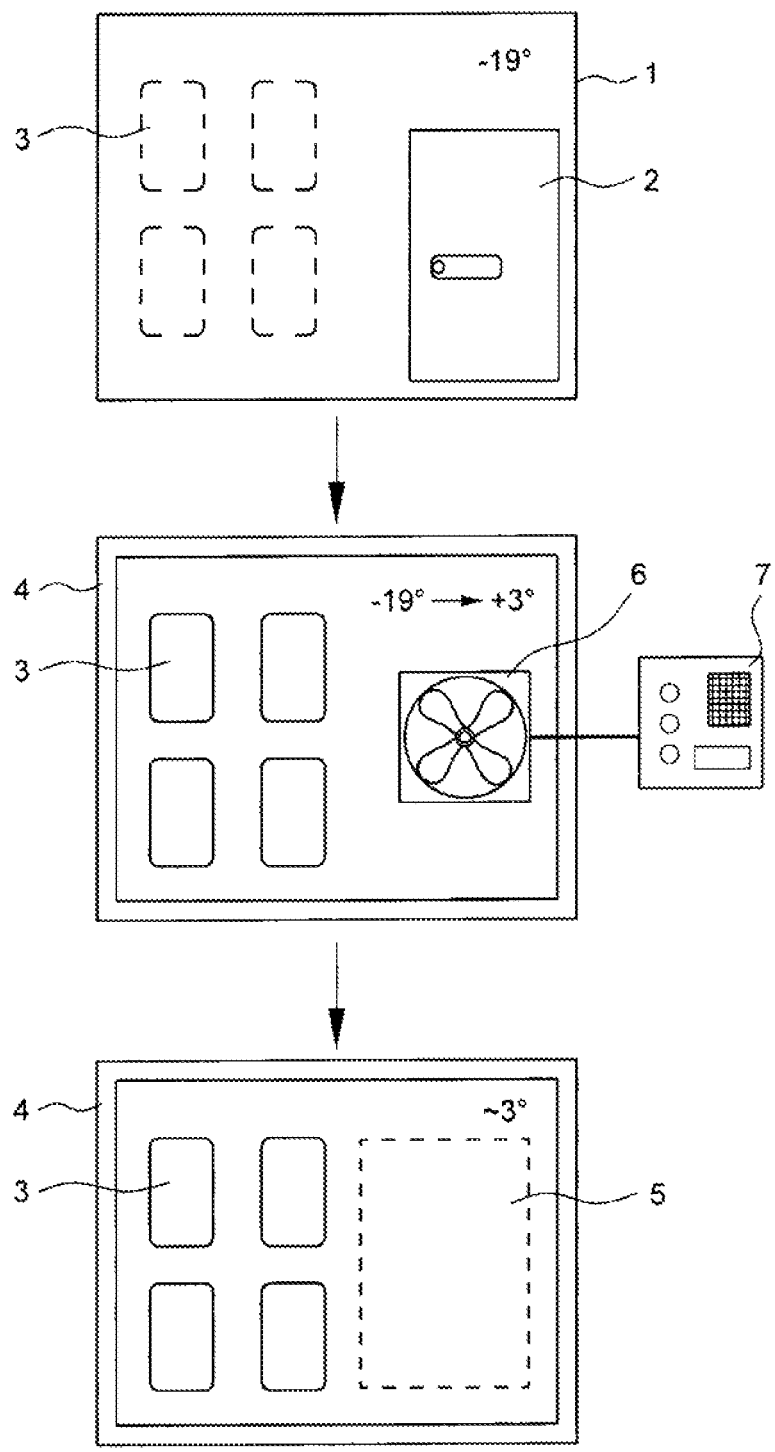
FIG. 1 shows a preferred method sequence with reference to a block diagram.

FIG. 1 first of all at the top shows a cooling room 1 with a closure door 2 as an example of how latent heat storage elements 3, which are likewise indicated at the top in FIG. 1, can be cooled to an initial temperature lying below the target temperature. A cooling room 1 (freezing room) with a typical temperature of −19° C. is illustrated. The precise temperature is not important. It is merely essential for the latent heat storage elements 3 in the cooling room 1 to have a definable, i.e. precisely determinable, initial temperature.

In the second illustration in FIG. 1, the four latent heat storage elements 3 have been removed from the cooling room 1 and introduced into a thermally insulating, closed container 4. According to a preferred exemplary embodiment of the invention, this thermally insulated, closed container 4 is a container which serves later to transport temperature-sensitive items 5, illustrated by dashed lines in the third illustration.

Examples of such temperature-sensitive items 5, as has been explained at the beginning of the description, include pharmaceuticals, biotechnological products, transplant items, blood, temperature-sensitive foodstuffs, etc.

In the second illustration in FIG. 1, a heating device 6 is seen in the interior of the container 4. The heating device is indicated here as a fan heater. In the simplest case, a normal domestic fan heater can be used as the heating device 6 in such a container 4. The heating device 6 serves for heating the interior of the then closed container 4. The interior of the closed container 4, because of the insulation thereof, is initially at the initial temperature of the latent heat storage elements 3, or close thereto, after the latter have been introduced.

The low initial temperature of the latent heat storage elements 3, the thermal capacity of the latent heat storage elements 3 in the container 4, and the target temperature for said latent heat storage elements 3 are used to calculate, here by means of a control device 7 located outside the container 4, the quantity of heat which has to be supplied to the interior of the container 4 so that the latent heat storage elements 3 reach the target temperature thereof as precisely as possible. The desired quantity of heat which has to be introduced is therefore determined.

An even more precise calculation of the desired quantity of heat is possible when the initial temperature of the container 4 before the latent heat storage elements 3, which are at the initial temperature thereof, are put into the container 4, is also detected as an input variable in the calculation of the desired quantity of heat.

The determination of the initial temperature of the latent heat storage elements 3 is not especially critical in the method according to the invention. This is because, as explained at the beginning, the quantity of heat to be introduced for a defined temperature difference in the event of sensible heat storage is not particularly large. This can be explained using the example of water. In order to convert, i.e. to melt, water from the solid phase at 0° C. into the liquid phase at 0° C., just as large a quantity of heat is required as is subsequently required for heating the water from 0° C. to 80° C. There is therefore a considerable tolerance range at the initial temperature of the latent heat storage elements 3, which is within the range of sensible heat.

In the exemplary embodiment illustrated in FIG. 1, the heating device 6 is switched on by means of the control device 7 and is operated continuously or at intervals until the desired quantity of heat has been introduced into the interior of the container 4. The heating device 6 is then switched off. In the middle illustration in FIG. 1, this is illustrated schematically by the temperature rise from −19° C. to +3° C. In practice, it will generally be the case that the heating device 6 heats the temperature in the interior of the closed container 4 to a significantly higher value than the target temperature of the latent heat storage elements 3, and is switched off namely whenever the desired quantity of heat has been supplied. The temperature equalization which has already been described further above then takes place in the container 4, which continues to be closed, by means of heat transfer from the interior of the container 4 into the latent heat storage elements 3. The temperature stated here of +3° C. for the middle illustration in FIG. 1 of the drawing stands for the final state in which the latent heat storage elements 3 have been heated to the target temperature of +3° C.

As has been explained further above, it is possible, even in the event of a very narrow temperature range of the phase transition of the latent heat storage elements 3, because of the stipulation of the desired quantity of heat, to pre-condition the latent heat storage elements 3 in such a manner that said latent heat storage elements 3 are present in liquid and solid form in desired, predetermined portions.

In the lowermost illustration in FIG. 1 it is seen that the container 4 serves here at the same time as a transport container for the temperature-sensitive items 5. In this exemplary embodiment, for the transport of the items 5, the heating device 6 has been removed from the container 4. The control device 7 has also been decoupled. The temperature in the interior of the container 4 is kept by the latent heat storage elements 3 at approximately 3° C., at the maximum rising slowly to 5° C., for a long period, for example 48 hours. For the transport, a temperature sensor for the temperature in the interior of the container 4 and a temperature display on the outside of the container 4 can also be present. This permits checking of the temperature in the interior of the container 4 during the transport.

Figure 2:
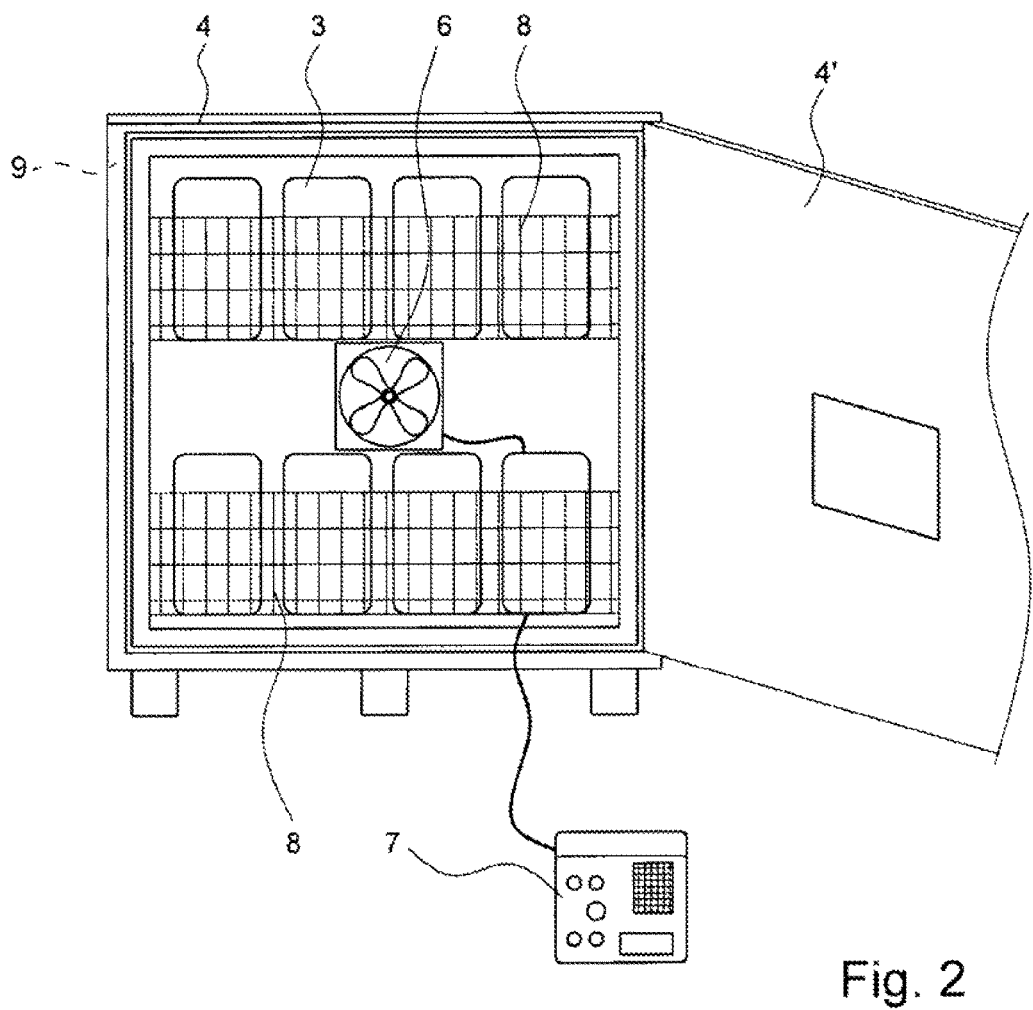
FIG. 2 shows a preferred container, which is directly suitable as a transport container, for use in the method according to the invention and within an apparatus according to the invention.

FIG. 2 shows, greatly schematized, a typical transport container 4 for temperature-sensitive items 5. The latter are not illustrated here in the transport container 4. The transport container 4 is closed by a closure door 4' attached on the right. The closure door 4' is currently open in order to be able to see into the interior of the container 4. A multiplicity of latent heat storage elements 3 are seen in the interior of the container 4, which latent heat storage elements 3 are arranged in drawer-type guides 8 on the walls in the interior of the container 4 in the illustrated and preferred, exemplary embodiment. The transport container 4 is extremely efficiently insulated to the outside by vacuum insulation panels 9 arranged in the walls of said transport container (concealed in the walls, therefore reference line dashed). In detail, reference may be made to the comments made in this respect in the introductory part of the description and to the prior art mentioned there.

The heating device 6 which is arranged in the interior of the transport container 4 in FIG. 2 and is in the form, of a fan heater is seen in the figure. A control cable leads from the heating device 6 out of the transport container 4 to an electronic control device 7. If, on the basis of the illustration in FIG. 2, the closure door 4' is closed, the pre-conditioning of the latent heat storage elements in the interior of the transport container 4 can begin.

The pre-conditioning according to the invention of latent heat storage elements can be reliably carried out worldwide because there are cooling rooms, in which the latent heat storage elements 3 can be pre-conditioned to a suitable initial temperature, worldwide. On the basis of this, the method according to the invention and the apparatus according to the invention themselves provide the route for arriving precisely at the target temperature by heating. This is possible because the desired quantity of heat to be supplied is calculated and is used for controlling the method.

Owing to the fact that, in the preferred refinement of the method according to the invention and of the apparatus according to the invention, the heating device 6 is removed after the pre-conditioning of the latent heat storage elements 3 in the interior of the container 4, the container 4 which then serves for transporting the temperature-sensitive goods operates purely passively. It is therefore suitable without restrictions for air freight.

The invention claimed is:

1. A method for the pre-conditioning of one or more latent heat storage elements for which a temperature range of a phase transition defines a target temperature, the method comprising:
    cooling the one or more latent heat storage elements to an initial temperature lying below the target temperature;
    measuring the initial temperature;
    introducing the one or more latent heat storage elements, which are at the initial temperature, into a thermally insulated container and then closing the container;
    wherein an interior of the container is connected to a powered heating device, the thermal output of which becomes effective in the interior of the container when the container is closed;
    wherein the thermal output of the powered heating device is known;
    using the initial temperature of the one or more latent heat storage elements, the thermal capacity of the one or more latent heat storage elements as located in the container, and the target temperature of the one or more latent heat storage elements to calculate a quantity of heat that has to be supplied to the interior of the container in order for the one or more latent heat storage elements to reach the target temperature; and
    switching the powered heating device on and operating the powered heating device continuously or at intervals until the desired quantity of heat has been supplied to the interior of the container so that the one or more latent heat storage elements are heated to the target temperature.

2. The method as claimed in claim 1, wherein, as a further input variable for calculating the desired quantity of heat, the initial temperature of the container before the introduction of the one or more latent heat storage elements, which are at their initial temperature, is measured and is used in the calculation of the desired quantity of heat.

3. The method as claimed in claim 1, wherein the target temperature of the one or more latent heat storage elements is placed into a lower limit of the temperature range of the phase transition of the latent heat storage elements.

4. The method as claimed in claim 1, wherein the powered heating device is arranged outside of the closed container and is connected to the interior of the container such that the heat is transmitted to the interior of the container.

5. The method as claimed in claim 1, wherein the powered heating device which is initially located in the container is removed from the container after the desired quantity of heat has been reached.

6. The method as claimed in claim 1, wherein the powered heating device is controlled by an electronic control device.

7. The method as claimed in claim 6, wherein the desired quantity of heat is calculated by a computer device that is separate from the control device.

8. The method as claimed in claim 1, wherein the container is a transport container that is provided for transport of temperature-sensitive items.

9. The method as claimed in claim 8, wherein the powered heating device is removed from the container before the transport of the temperature-sensitive items.

10. The method as claimed in claim 1, wherein the container is thermally insulated with vacuum insulation panels.

11. An apparatus for the pre-conditioning of one or more latent heat storage elements, the apparatus comprising:
    a container that is thermally insulated;
    a powered heating device for heating the interior of the container when the container is closed;
    a control device for controlling the powered heating device;
    wherein the one or more latent heat storage elements have a known initial temperature and being arrangeable in the container;
    wherein the one or more latent heat storage elements are configured to be arranged in the container and are brought to a target temperature that is higher than the initial temperature by the powered heating device;

wherein the control device is configured to calculate, on the basis of the initial temperature of the one or more latent heat storage elements, the thermal capacity of the one or more latent heat storage elements located in the container and the target temperature of the one or more latent heat storage elements, the quantity of heat to be supplied to the interior of the container such that the one or more latent heat storage elements reach the target temperature; and wherein, after the desired quantity of heat is introduced into the interior of the container, the powered heating device is controllable by the control device to stop supplying heat to the interior of the container.

12. The apparatus as claimed in claim 11, wherein the initial temperature of the container before the introduction of the one or more latent heat storage elements, which is measurable, is incorporated as a further input variable for calculating the desired quantity of heat, and wherein the initial temperature of the container is usable in the calculation of the desired quantity of heat.

13. The apparatus as claimed in claim 11, wherein the powered heating device is arranged outside of the container and is connected to the interior of the container such that heat is transmittable to the interior of the container.

14. The apparatus as claimed in claim 11, wherein the container is a transport container that is suitable for the transport of temperature-sensitive items.

15. The apparatus as claimed in claim 11, wherein the thermal insulation of the container includes vacuum insulation panels.

16. The apparatus as claimed in claim 11, further comprising a further unit for calculating the quantity of heat, wherein the container, the powered heating device, the control device, and the further unit for calculating the quantity of heat are separate components.

17. The apparatus as claimed in claim 16, wherein one or more of the container, the powered heating device, the control device, and the further unit for calculating the quality of heat form a cohesive unit within the apparatus, wherein the apparatus comprises more than the cohesive unit.

18. The apparatus as claimed in claim 11, wherein the container, the powered heating device, the control device and a further unit for calculating the quantity of heat are embodied as a single complete unit.

* * * * *